United States Patent [19]

Schönlau et al.

[11] 3,890,943
[45] June 24, 1975

[54] VALVE ROTATING DEVICES
[75] Inventors: Herbert Schönlau; Walter Meyerhoff, both of Hannover, Germany
[73] Assignee: Teves-Thompson GmbH, Germany
[22] Filed: Dec. 3, 1973
[21] Appl. No.: 421,116

[30] Foreign Application Priority Data
Dec. 11, 1972  Germany.............................. 2260628
Dec. 11, 1972  Germany.............................. 2260726

[52] U.S. Cl. ............. 123/90.3; 137/331; 123/90.28
[51] Int. Cl. .......................... F01l 1/32; F16k 29/00
[58] Field of Search............. 123/90.3, 90.29, 90.28, 123/90.67; 137/331; 251/333

[56] References Cited
UNITED STATES PATENTS
2,397,502  4/1946  Ralston .............................. 123/90.3
2,806,460  9/1957  Beardsley .......................... 123/90.3
3,710,768  1/1973  May .................................... 123/90.3
3,717,132  2/1973  Van Slooten ...................... 123/90.3
FOREIGN PATENTS OR APPLICATIONS
715,889  9/1954  United Kingdom................. 123/90.3

*Primary Examiner*—Charles J. Myhre
*Assistant Examiner*—W. Rutledge, Jr.
*Attorney, Agent, or Firm*—Hill, Gross, Simpson, Van Santen, Steadman, Chiara & Simpson

[57]  ABSTRACT

A valve rotating device for incrementally rotating a valve, particularly a valve in an internal combustion engine, the device including a housing arranged to seat a valve spring thereon, a retainer cap received within the housing, a spring washer having its inner periphery bottomed on the retainer cap and shiftable means acting between the spring washer and the retainer cap to incrementally rotate the retainer cap during axial movement of a valve stem within the housing, the spring member and the housing each having complementarily shaped straight sided portions preventing relative rotation between the two. The device of the present invention may also include a raceway located between the spring washer and the shiftable elements.

6 Claims, 8 Drawing Figures

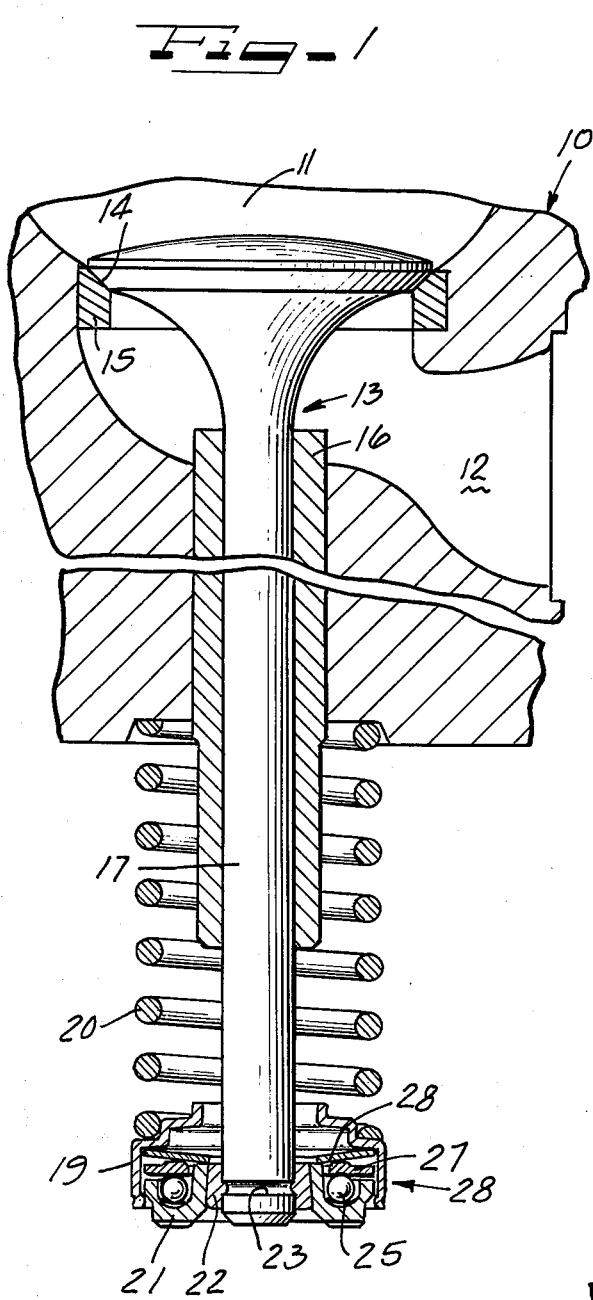
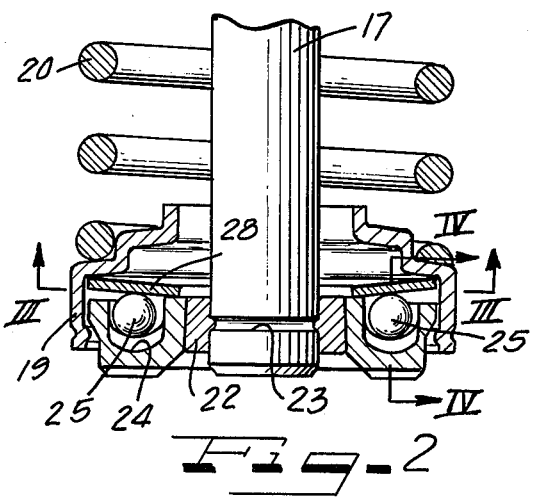
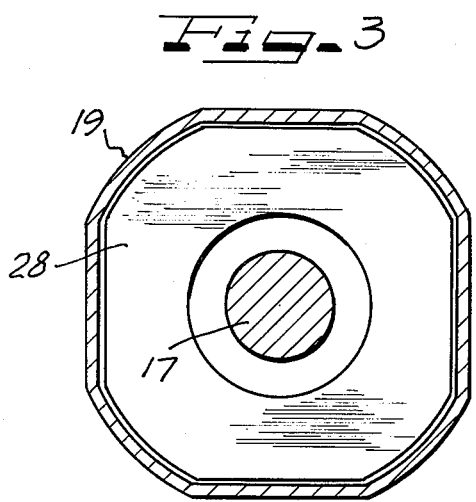
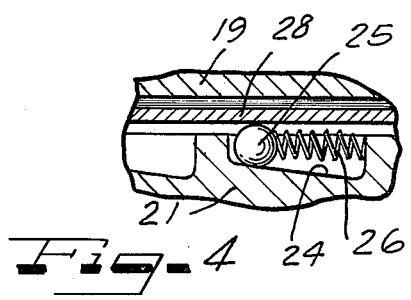

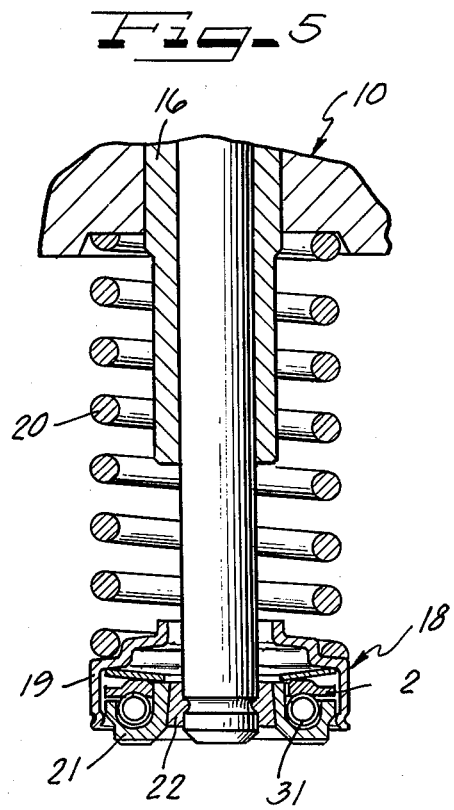
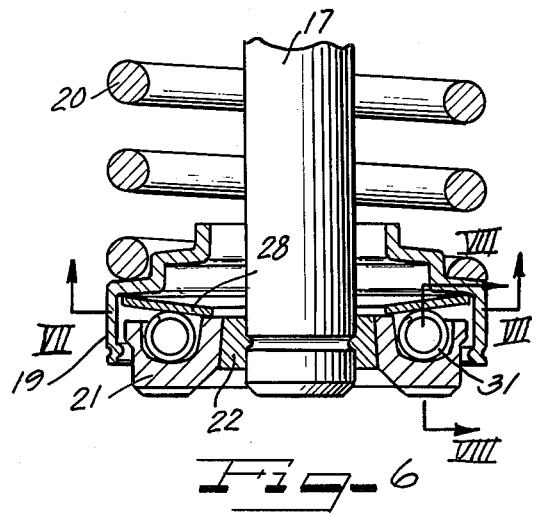
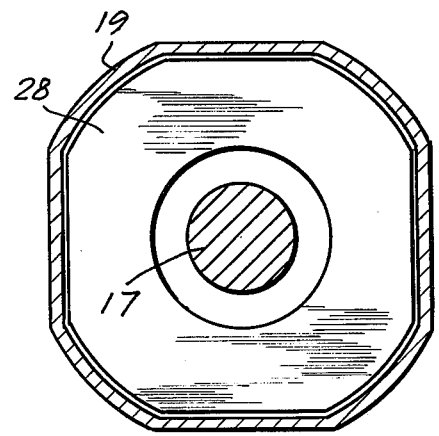
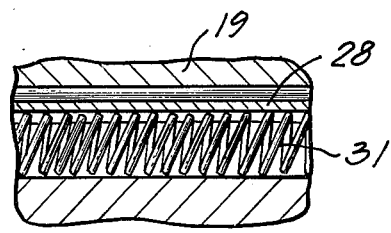

VALVE ROTATING DEVICES

BACKGROUND OF THE INVENTION

1. Field of the Invention

This invention is in the field of valve rotating devices which incrementally rotate the valve during axial movement thereof, making use of a spring washer which applies a shifting force to shiftable elements located within a retainer cap during the axial movement, the shiftable elements then operating to incrementally rotate the retainer cap and the valve coupled thereto.

2. DESCRIPTION OF THE PRIOR ART

Devices for rotating valves each time the valve heads are raised from their seats have been widely used in the automotive industry. One of the earliest and most comprehensive disclosures of such valve rotating devices appears in the Ralston U.S. Pat. No. 2,397,502. The Ralston patent describes numerous embodiments of valve rotating devices for use with a spring pressed poppet valve. The assemblies described in the Ralston patent include a retainer cap carrying shiftable elements such as balls, rollers, wedges and the like, and a resilient member which deflects under increased loads to transfer the spring load from the retainer cap to a shiftable elements whereupon the load on the shiftable elements causes them to shift and produce relative rotation between the retainer cap and the housing against which the spring is bottomed. The retainer cap is fixed against relative rotation on the valve and the relative rotation produced between the retainer cap and the resilient member causes the valve to rotate. The rotation of the poppet valve during operation of the internal combustion engine keeps the valve seat and the valve stem free from carbon and other contaminants, as well as providing for relatively uniform seat wear throughout the life of the valve.

Various improvements have been suggested to this type of basic structure over the years. Reference is invited to German Pat. No. 1,028,384 and to German Laid Open Specifications Nos. 2,015,036 and 2,040,467 filed on behalf of Teves-Thompson for examples of such improvements.

SUMMARY OF THE INVENTION

The present invention provides an improvement in valve rotating devices for internal combustion engines which make use of washer springs which upon deflection by the pressure created by the valve spring itself acts against shiftable elements such as spring pressed balls or coiled springs to cause shifting of the shiftable elements during the axial stroke of the valve so that the shiftable elements rotate the retainer cap in which they are located and thereby rotate the valve incrementally.

The present invention is directed to the problem of reducing wear resulting from the high pressures existing on the shiftable elements during operation which could lead to erratic operation of the valve rotator. One of the features of the present invention provides a geometry of the spring washer and housing which prevents relative rotation between the two, thereby reducing the possibility of wear and insuring positive, precise rotation of the valve in each cycle.

BRIEF DESCRIPTION OF THE DRAWINGS

Although minor modifications might be suggested by those versed in the art, it should be understood that we wish to embody within the scope of the patent warranted hereon all such modifications as reasonably and properly come within the scope of our contribution to the art.

FIG. 1 is a fragmentary view, partly in cross-section, of a poppet valve assembly including an improved valve rotating device according to the present invention;

FIG. 2 is a fragmentary view on an enlarged scale of a modified form of a valve rotating device according to the present invention;

FIG. 3 is a cross-sectional view taken substantially along the line III—III of FIG. 2;

FIG. 4 is a fragmentary cross-sectional view taken substantially along the line IV—IV of FIG. 2;

FIG. 5 is a fragmentary view, partly in cross-section, of a further modified form of a valve rotating device according to the present invention;

FIG. 6 is a fragmentary cross-sectional view on an enlarged scale of a modified form of the invention;

FIG. 7 is a cross-sectional view taken substantially along the line VII—VII of FIG. 6; and FIG. 8 is a fragmentary cross-sectional view taken substantially along the line VIII—VIII of FIG. 6.

DESCRIPTION OF THE PREFERRED EMBODIMENTS

In FIG. 1, reference numeral 10 has been applied generally to an engine block of an internal combustion engine in which there is a combustion chamber 11 and an exhaust port 12. A poppet valve 13 has a valve seating face 14 arranged to be seated on a valve seating ring 15 secured in a suitable recess in the engine block 10. A valve stem guide 16 is provided for slidably receiving a stem portion 17 of the valve 13.

The valve rotating device of the present invention is identified generally at reference numeral 18 in FIG. 1. The valve rotating device 18 includes a housing 19 of generally stepped configuration, and providing a seating surface for a valve spring 20 which operates between the housing 19 and a suitable recess formed in the engine block 10. Disposed within the housing 19 is a retainer cap 21 which is firmly secured to a valve retainer lock 22, the latter being received tightly within a groove 23 located at the tip end of the valve 13. The retainer cap 21 is thus fixedly secured to the valve 13.

The retainer cap 21 has a series of circumferentially spaced inclined grooves 24 formed therein (FIG. 4) each of which receives a ball 25 and a spring 26 normally urging the ball 25 into the shallow dimension of the groove.

In the form of the invention shown in FIG. 1, there is provided a raceway 27 which engages each of the balls 25. A washer spring 28 has its inner periphery bottomed on an inner peripheral wall of the retainer cap 21 and its outer periphery engages an inner wall of the housing 19 as shown in FIG. 1.

The structure shown in FIG. 2 is identical with that shown in FIG. 1 with the exception that the raceway 27 is eliminated. Consequently, the same reference numerals have been applied to each of the structures. In the form of the invention shown in FIG. 2, the washer spring 28 bears directly against each of the balls 25.

Substantial loads are applied against the spring washer 28 (or the combination of the spring washer 28 and the raceway 27) during operation of the valve. Consequently, as the washer spring 28 or the raceway 27 continues to bear against the ball 25, there is an increased tendency of the washer spring 28 to rotate with the shiftable ball 25. This is prevented by using a geometry of parts such as shown in FIG. 3. From that figure it will be seen that the washer spring 28 and the housing 19 have complementarily shaped surfaces, each including a plurality of straight sides and rounded corners. The generally polygonal shape of the two closely spaced members prevent relative rotation between the washer spring 28 and the housing 19. In the case that a raceway 27 is employed, that, too should have a shape complementary to that of the spring washer 28 and the housing 19, so that all three of the elements are incapable of rotation relative to each other.

The device shown in FIGS. 1 to 4 operates in the manner of conventional valve rotating assemblies. When the poppet valve 13 is seated against the seating ring 15, the load imposed on the valve rotating device by the spring 20 is insufficient to bow or deflect the spring washer 28 over the balls 25. In this condition, the spring washer 28 transfers the load of the spring 20 directly to the retainer cap 21, and the return springs 26 urge the balls 25 into the shallow ends of the grooves 24 where they are in snug contact with the spring washer 28.

When the valve 13 is raised off its seat, the valve spring 20 is compressed and the load on the spring washer 28 is increased to the point where the washer flexes and is bowed or deflected radially to apply substantial force on the balls 25. When the spring load is transferred to the balls, they roll down into the deeper end of the grooves 24. Since the spring washer 28 cannot rotate due to the pressure of the spring 20, the retainer cap 21 is rotated by the movement of the rolling balls 25, thereby incrementally rotating the valve stem 17.

The forms of the invention illustrated in FIGS. 5 to 8, inclusive, are similar in most respects to those shown in FIGS. 1 to 4, inclusive. Consequently, the same reference numerals have been applied to corresponding elements. The valve rotating device illustrated in FIG. 5, however, makes use of a helical spring ring 31 as the shiftable element. In the form illustrated in FIG. 5, the spring ring 31 is combined with a raceway 32. In the form of the invention illustrated in FIG. 6, the raceway has been eliminated so that the spring washer 28 bears directly against the helical spring ring 31. The pitch of the spring ring 31 is such that substantial pressure provided by the spring washer 28 as a result of compression of the spring 20 causes the coils of the spring ring 31 to shift laterally and to return to their original form when the force is lessened, thereby providing incremental movement of the retainer cap 21 which causes incremental rotation of the valve to which it is coupled.

As illustrated in FIG. 7, the spring washer 28 and the housing 19 are complementarily shaped, as in the previously described embodiment, so that relative rotation between the spring member 28 and the housing 19 is prevented during actuation of the rotator. By preventing such relative movement, wear between the spring washer 28 and the helical spring ring 31 is prevented, thereby insuring positive operation of the valve rotator through a prolonged period.

From the foregoing, it will be understood that the present invention provides an improved valve rotating device for internal combustion engines which reduces wear between the cooperating elements and which provides positive rotation of the valve during each axial stroke of the valve.

It should be evident that various modifications can be made to the described embodiments without departing from the scope of the present invention.

We claim as our invention:

1. A valve rotating device comprising a housing arranged to seat a valve spring thereon, a retainer cap received within said housing, a spring washer having its inner periphery bottomed on said retainer cap, a valve having a valve stem secured to said retainer cap, and shiftable means acting between said spring member and said retainer cap to incrementally rotate said retainer cap during axial movement of said valve stem within said housing, said spring member being enclosed entirely by said housing in closely spaced relation thereto, said spring member and said housing each having complementarily shaped straight sided portions preventing relative rotation between the two.

2. The valve rotating device of claim 1 in which a raceway is interposed between said spring washer and said shiftable means, said raceway having a shape complementary to both said spring washer and said housing.

3. The valve rotating device of claim 1 in which said shiftable means includes a plurality of circumferentially spaced spring pressed balls.

4. The valve rotating device of claim 3 in which said spring washer bears directly against said balls.

5. The valve rotating device of claim 1 in which said housing and said spring washer have a generally polygonal shape.

6. The valve rotating device of claim 1 in which said housing and said spring washer each have a plurality of straight sides and rounded corners.

* * * * *